US012801604B2

(12) United States Patent
Park et al.

(10) Patent No.: US 12,801,604 B2
(45) Date of Patent: Nov. 17, 2026

(54) Q-ERROR BOUNDED JOIN SIZE ESTIMATION

(71) Applicant: SAP SE, Walldorf (DE)

(72) Inventors: Ji-Won Park, Seoul (KR); Jaehyok Chong, Seoul (KR)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 18/975,883

(22) Filed: Dec. 10, 2024

(65) Prior Publication Data

US 2026/0161646 A1 Jun. 11, 2026

(51) Int. Cl.
*G06F 16/24* (2019.01)
*G06F 16/2453* (2019.01)

(52) U.S. Cl.
CPC .............................. *G06F 16/24537* (2019.01)

(58) Field of Classification Search
CPC ..................... G06F 16/24537; G06F 16/24542
See application file for complete search history.

(56) References Cited

U.S. PATENT DOCUMENTS 4,497,039 A * 1/1985 Kitakami .................. G06F 7/22
6,477,523 B1 * 11/2002 Chiang ............. G06F 16/24545
7,685,098 B2 * 3/2010 Przywara ............ G06F 16/2456 707/999.002
7,984,024 B2 * 7/2011 Bossman ............ G06F 16/2462 707/688
9,378,243 B1 * 6/2016 Korlapati .......... G06F 16/24537
12,430,334 B2 * 9/2025 Nishikawa ........ G06F 16/24544
2003/0126127 A1 * 7/2003 Abdo .................. G06F 16/2462
2005/0289191 A1 * 12/2005 Popivanov .............. G06F 16/21
2009/0094236 A1 * 4/2009 Renkes ............... G06F 16/2272
2011/0029507 A1 * 2/2011 Au ...................... G06F 16/2456 707/E17.002
2013/0060780 A1 * 3/2013 Lahiri ..................... H03M 7/42 707/E17.037
2014/0280024 A1 * 9/2014 Baskett ............ G06F 16/24528 707/714
2017/0060856 A1 * 3/2017 Turtle ..................... G06F 16/00
2018/0181542 A1 * 6/2018 Nica ....................... G06F 17/18

(Continued)

OTHER PUBLICATIONS

Wang et al., Are We Ready for Learned Cardinality Estimation?, VLDB Endowment, p. 1641-1642 (Year: 2021).*

(Continued)

*Primary Examiner* — Sherief Badawi
*Assistant Examiner* — Andrew N Ho
(74) *Attorney, Agent, or Firm* — Klarquist Sparkman, LLP

(57) ABSTRACT

A computer implemented method receives a query to perform a join operation that joins a first table with a second table based on matching values in a selected column of the first table with values in a selected column of the second table, obtains a first dictionary for the selected column of the first table and a second dictionary for the selected column of the second table, and determines an output size of the join operation based on the first dictionary and the second dictionary. A dictionary for a given column includes a plurality of unique values in the given column and corresponding range indices. A count of a given unique value in the given column is mapped to a range associated with a range index corresponding to the given unique value. Related systems and software for implementing the method are also disclosed.

20 Claims, 10 Drawing Sheets

(56) References Cited

U.S. PATENT DOCUMENTS

| | | | | |
|---|---|---|---|---|
| 2018/0341679 | A1* | 11/2018 | Moerkotte | G06F 16/2455 |
| 2019/0347344 | A1* | 11/2019 | Kessler | G06F 11/3055 |
| 2022/0253425 | A1* | 8/2022 | Budalakoti | G06N 5/04 |
| 2022/0269684 | A1* | 8/2022 | Brendle | G06F 16/217 |
| 2022/0284023 | A1* | 9/2022 | Li | G06F 11/3419 |
| 2023/0177035 | A1* | 6/2023 | Wei | G06F 16/1824<br>707/741 |

OTHER PUBLICATIONS

Wikipedia, "Big O notation," https://en.wikipedia.org/wiki/Big_O_notation, 20 pages (downloaded Nov. 12, 2024).

SAP, "SAP HANA Administration Guide for SAP HANA Platform," https://help.sap.com/docs/SAP_HANA_PLATFORM/6b94445c94ae495c83a19646e7c3fd56?locale=en-US&state=PRODUCTION&version=2.0.07, 10 pages (downloaded Nov. 11, 2024).

Li et al., "Updateable Data-Driven Cardinality Estimator with Bounded Q-error," *Conference '17*, Jul. 2017, Washington, DC, USA, arXiv:2408.17209v1, 13 pages (downloaded Aug. 30, 2024).

Moerkotte et al., "Preventing Bad Plans by Bounding the Impact of Cardinality Estimation Errors," *VLDB '09*, Aug. 24-28, 2009, Lyon, France, 12 pages.

Moerkotte et al., "Exploiting Ordered Dictionaries to Efficiently Construct Histograms with Q-Error Guarantees in SAP HANA," *SIGMOD '14*, Jun. 22-27, 2014, Snowbird, UT, USA, pp. 361-372.

Extended European Search Report, European Application No. 25210209.0, Feb. 19, 2026, 9 pages.

Muller et al., "Memory-Efficient Key/Foreign-Key Join Size Estimation via Multiplicity and Intersection Size," *2021 IEEE 37th International Conference on Data Engineering (ICDE)*, pp. 984-995, Apr. 19, 2021.

Yang et al., "Deep Unsupervised Cardinality Estimation," *Proceedings of the VLDB Endowment*, vol. 13, No. 3, 14 pages, May 10, 2019.

* cited by examiner

700

| Country | City |
| --- | --- |
| Germany | Berlin |
| France | Paris |
| Russia | Moscow |
| Russia | Moscow |
| Italy | Rome |
| South Korea | Seoul |
| Germany | Berlin |
| . . . | . . . |

710

| Country | City |
| --- | --- |
| USA | San Francisco |
| Canada | Vancouver |
| . . . | . . . |

720

| rid | vid |
| --- | --- |
| 1 | 1 |
| 2 | 3 |
| 3 | 2 |
| 4 | 2 |
| 5 | 4 |
| 6 | 5 |
| 7 | 1 |
| ... | ... |

730

| vid | value | f(count) |
| --- | --- | --- |
| 1 | Berlin | 14 |
| 2 | Moscow | 2 |
| 3 | Paris | 8 |
| 4 | Rome | 1 |
| 5 | Seoul | 1 |
| ... | ... | |

FIG. 7

800

| vid | value | f(count) |
|---|---|---|
| 1 | Berlin | 14 |
| 2 | Moscow | 2 |
| 3 | Paris | 8 |
| 4 | Rome | 1 |
| 5 | Seoul | 1 |

810

| vid | value | f(count) |
|---|---|---|
| 1 | Beijing | 6 |
| 2 | Berlin | 10 |
| 3 | Paris | 1 |
| 4 | Seoul | 2 |

820

| value | N1 | N2 | count |
|---|---|---|---|
| Berlin | 42,356 | 18,439 | 781,002 |
| Paris | 11,958 | 1 | 11,958 |
| Seoul | 1 | 2 | 2 |

FIG. 8

Q-ERROR BOUNDED JOIN SIZE ESTIMATION

BACKGROUND

In column store relational databases, data is stored by attributes in columns. Structured query language (SQL) is a standard language for storing and processing information in these relational databases. Query optimization aims to select the most efficient execution plan for a given SQL query. Accurate join size estimation is essential in query optimization, as it influences the selection of optimal join strategies and resource allocation. However, the current methodology for join size estimation often relies on uniform distribution and optimal match assumptions, which can lead to inaccurate estimates, especially when data distributions are skewed, or columns do not align as assumed. Thus, room for improvement exists in join size estimation techniques to enhance the performance of query optimization.

BRIEF DESCRIPTION OF THE DRAWINGS

FIG. 7 depicts a database table, a delta table, a data vector and a dictionary corresponding to a column of the database table, according to one example.

FIG. 8 depicts two example dictionaries for join size estimation and generation of a join histogram.

DETAILED DESCRIPTION

Overview of Join Size Estimation

Figure 1:
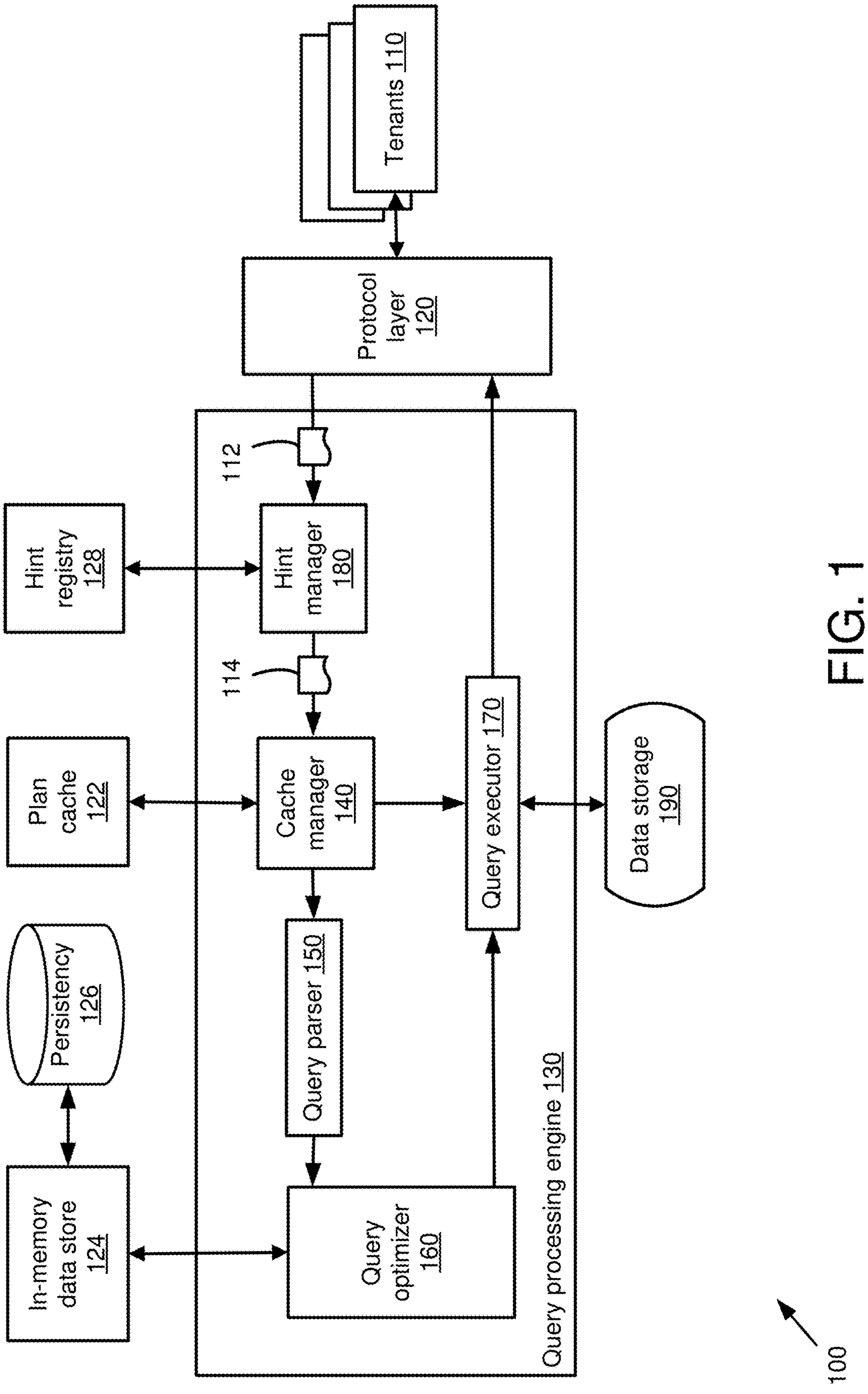
FIG. 1 is an overall block diagram of an example database management system supporting improved join size estimation technology disclosed here.

The aim of query optimization is to select a query plan (from many candidate query plans) that yields optimal performance. Performance of a query plan can be described in terms of cost, which can be time (e.g., time required to execute the query plan) and/or burden on computing resources (e.g., processing power and/or memory expended to execute the query plan). Cost-based query optimization chooses the query plan that is deemed to have the lowest cost among all candidate query plans.

One key factor in determining the cost of a query plan is join size estimation, which estimates the number of records that will result from joining two or more tables. Accurate join size estimation is important for cost-based optimization, as it impacts which join strategies are chosen, the order in which joins are executed, and how memory and processing power are allocated. If the join size estimate is too high or too low, the query optimizer may choose a less efficient query plan, resulting in unnecessary resource consumption or prolonged query execution time. Thus, join size estimation directly influences the overall efficiency and scalability of database systems, particularly in handling large and complex queries.

Existing techniques for join size estimation often rely on assumptions of uniform data distribution and an optimal match between join column values, but these assumptions do not always hold in real-world data scenarios. For example, consider two tables, T1 and T2, where a column C1 in T1 and a column C2 in T2 are disjoint—for example, when C1 contains even integers and C2 contains odd integers. In this case, a join between T1 and T2 on the condition C1=C2 would produce no matching rows, resulting in an actual join size of zero. However, conventional estimation methods based on the optimal match assumption would likely predict a non-zero join size based on a formula that approximates the join cardinality as (|T1|×|T2|)/max (dcount(T1), dcount(T2)), where |T1| and |T2| respectively represent the row counts of tables T1 and T2, and max (dcount(T1), dcount(T2)) represents the maximum number of distinct value counts between two columns of join tables T1 and T2. This overestimation can lead to inefficient query plans and excessive resource allocation.

One way to evaluate the accuracy of join size estimation methods is through the metric known as q-error, which represents the ratio between the estimated join size and the actual join size. Mathematically, the q-error can be expressed as:

$$q\text{-error} = \max\left(\frac{\text{estimated join size}}{\text{actual join size}}, \frac{\text{actual join size}}{\text{estimated join size}}\right)$$

A q-error of 1 indicates a perfect estimate, while higher q-errors reflect greater inaccuracies. Limiting q-error is important, as even modest estimation errors can compound in complex queries involving multiple joins.

The technologies described herein provide an enhanced approach to join size estimation. As described more fully below, by leveraging dictionaries with count approximation, the disclosed technologies can improve join size estimation accuracy and guarantee a bounded q-error. This ensures that query optimization is supported by reliable join size estimates, resulting in more efficient and predictable query plans.

Example Database System Supporting Improved Join Size Estimation Using Dictionaries FIG. 1 shows an overall block diagram of an example database management system 100 supporting improved join size estimation using dictionaries. The database management system 100 can be configured to support multi-tenancy, which is a feature in many types of cloud computing services. In a multi-tenancy environment, one instance of a software application and supporting infrastructure (e.g., virtual machines, memories, etc.) can serve multiple user groups, or tenants. Thus, multiple tenants can share the same application and other computing resources running on the same operating system, on the same hardware, with the same data-storage mechanism(s). Even though resources are shared, each tenant can appear to have its own instance of the application. Importantly, the underlying data of the tenants can be kept separate and secure.

As shown, the database management system 100 includes a query processing engine 130 and a protocol layer 120 which serves as an interface between one or more tenants 110 and the query processing engine 130. For example, the protocol layer 120 can implement a server name indication protocol by which the tenants 110 can connect to the query processing engine 130. Each tenant 110 represents a group of users who can access a tenant-specific database (e.g., data storage 190) managed by the database management system 100.

In some examples, the query processing engine 130 can include a hint manager 180, a cache manager 140, a query parser 150, a query optimizer 160, and a query executor 170.

An incoming query 112 sent from a tenant 110 can be processed by the hint manager 180 to output a query 114, which can be the same as or different from the incoming query 112. The hint manager 180 maintains a hint registry 128. The hint registry 128 can store hint records, each of which includes a hint target and a hint (also referred to as a "hint string") paired with the hint target. In some examples, a hint target can be a query statement, which can also be referred to as a "target query statement." In this scenario, the hint in the hint record can be paired with the target query statement. In some examples, a hint target can be one or more database objects, which can also be referred to as "target objects." In this scenario, the hint in the hint record can be paired with the one or more target objects.

The hint manager 180 can search the hint registry 128 to identify if the incoming query 112 has a matching hint record. If a match is found, the hint specified in the hint record can be added to the incoming query 112, modifying it into a new query. This modified query is then propagated downstream for further processing. If no matching hint record is found, the incoming query 112 is not modified and can be passed directly for downstream query processing.

The cache manager 140 can access a plan cache 122, which represents a fast-access memory space configured to store previously compiled query plans. The cache manager 140 receives the query 114 (which can be the incoming query 112 added with a hint or the unmodified incoming query 112) sent from the hint manager 180. The cache manager 140 can evaluate the received query 114 to determine if the query 114 has a corresponding (previously compiled) query plan stored in the plan cache 122.

If the cache manager 140 finds no query plan in the plan cache 122 that corresponds to the query 114, the query 114 can be analyzed by the query parser 150, which can check if the query 114 contains syntactic and/or semantic errors. After verifying that the query 114 is a valid transactional SQL statement (e.g., SELECT, INSERT, UPDATE, DELETE, MERGE, etc.), the query parser 150 can generate a logical tree (also referred to as a "query tree") in which the query 114 can be executed.

As described herein, a query tree is a logical representation of the query statement. It includes a plurality of nodes and edges linking the nodes. The nodes can include leaf nodes and one or more internal nodes. A leaf node has no child nodes. In contrast, an internal node has one or more child nodes. The root of the query tree, or root node, can be regarded as a special internal node. The query tree denotes a relational algebra expression. Specifically, tables involved in the query can be represented as leaf nodes. The relational algebra operations can be represented as internal nodes. The root node represents the query as a whole and can also be referred to as a "project" node. When a query plan is executed, an internal node can be executed when its operand tables are available. The internal node can then be replaced by a result table generated by the operation represented by the internal node. This process can continue for all internal nodes until the root node is executed and replaced by the result table, which can be returned as query results.

The logical tree can be used by the query optimizer 160 to generate a corresponding query plan, which determines how the query 114 will be executed. The query optimizer 160 is configured to select a query plan (among a plurality of query plans that are generated based on enumeration of the logical tree) that yields optimal performance. Performance of a query plan can be described in terms of cost, which can be time (e.g., time required to execute the query plan) and/or burden on computing resources (e.g., processing power and/or memory expended to execute the query plan). Cost-based query optimization chooses the query plan with the lowest cost among all candidate query plans. In practice, although the terms "optimal" and "optimize" are used, the actual best query plan may not be selected, but the selected query plan is deemed better than others based on data available to the query optimizer 160.

The determined optimal query plan can then be sent to the query executor 170 for execution. The query executor 170 can communicate with a data storage 190 and execute operators in the query plan determined by the query optimizer 160. Data retrieved from the data storage 190 can be returned to the tenant 110 via the protocol layer 120.

In some examples, the query optimizer 160 can include a size estimator configured to estimate the join size of the query 114 based on dictionaries, which can be generated by a dictionary generator, as described more fully below.

The query optimizer 160 can bidirectionally communicate with an in-memory data store 124 configured to store intermediate results of query optimization, such as data tables, runtime statistics, hash tables, indexes, dictionaries, etc.

In some examples, the in-memory data store 124 can also maintain an execution history storing one or more serialized query plans, which can also be referred to as "abstract query plans" or ASPs. The execution history can be used to implement a feature called "plan stability." Plan stability operates by capturing selected ASPs and storing them in the execution history. If performance regression for a query plan occurs, these stored ASPs can be reused to regenerate the original query plans, thereby retaining the original performance. Data stored in the in-memory data store 124 can be persisted to a persistency or a persistence layer 126. The in-memory data store 124 is a volatile memory, which allows for fast access and manipulation of the data stored therein. The persistence layer 126 can ensure that the data tables, ASPs, hash tables, indexes, dictionaries, etc., are retained even when the volatile memory is cleared during a system restart. This allows for the data to be reloaded from the persistence layer 126 back into the in-memory data store 124, e.g., after the system restart.

As described herein, query compilation refers to the process of generating the optimal query plan (e.g., checking syntactic and/or semantic errors, generating the logical tree, and determining optimal query plan) for the query 114, as described above. Depending on the complexity of the query 114 (e.g., the number of joined tables, etc.) and the query optimization algorithm, query compilation time can be long (e.g., tens of seconds or more). Thus, to improve operational efficiency, the compiled query plan (i.e., the determined most optimal query plan) for the query 114 can be stored in the plan cache 122 so that it can be quickly retrieved and reused if the same query is encountered again in the future.

For example, if the cache manager 140 determines that the query 114 has a corresponding query plan stored in the plan cache 122, that query plan can be fetched directly from the plan cache 122 and forwarded to the query executor 170 for execution. Thus, in this scenario, operations by the query parser 150 and query optimizer 160 can be bypassed. In other words, the query 114 does not need to be recompiled because its previously compiled query plan is available in the plan cache 122.

The plan cache 122 is configured to store compiled query plans. For each received query 114, the cache manager 140 checks if it has a compiled query plan stored in the plan cache 122. If yes, then this cached query plan can be reused. This can improve efficiency because it eliminates the time of compiling the query 114 (i.e., regenerating the query plan). On the other hand, if the query 114 has no previously compiled query plan stored in the plan cache 122, the query 114 has to be compiled. The compiled query plan can then be stored in the plan cache 122 so that when the same query 114 occurs again in the future, fast access to its cached query plan is feasible.

If the received query 114 is new (i.e., a first-time query that has not been encountered before), this new query has no corresponding query plan in the plan cache 122 and it must be compiled for the first time. On the other hand, if the received query 114 is not new (e.g., the same query has been encountered at least once before), whether or not there is a corresponding compiled query plan in the plan cache 122 can depend on the size of the plan cache 122 and a plan eviction policy adopted by the cache manager 140.

The plan cache 122 has a limited size. Thus, it may not be able to store all compiled query plans. When the plan cache 122 approaches its full capacity, certain query plans may have to be evicted from the plan cache 122 to make room for new ones according to a predefined plan eviction policy implemented by the cache manager 140. For example, the cache manager 140 can implement a random plan eviction policy which evicts query plans from the plan cache 122 in a random manner. In another example, the cache manager 140 can implement the least recently used (LRU) plan eviction policy which removes the least recently used query plans first from the plan cache 122. In yet another example, the least frequently used (LFU) plan eviction policy can be used which first evicts the execution policies that are used least often. Other plan eviction policies can also be used by the cache manager 140.

In practice, the systems shown herein, such as database management system 100, can vary in complexity, with additional functionality, more complex components, and the like. For example, there can be additional functionality within the query processing engine 130. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The database management system 100 and any of the other systems described herein can be implemented in conjunction with any of the hardware components described herein, such as the computing systems described below (e.g., processing units, memory, and the like). In any of the examples herein, the queries, query plans, indexes, hash tables, dictionaries, and the like can be stored in one or more computer-readable storage media or computer-readable storage devices. The technologies described herein can be generic to the specifics of operating systems or hardware and can be applied in any variety of environments to take advantage of the described features.

Example Dictionary Generator and Size Estimator

Figure 2:
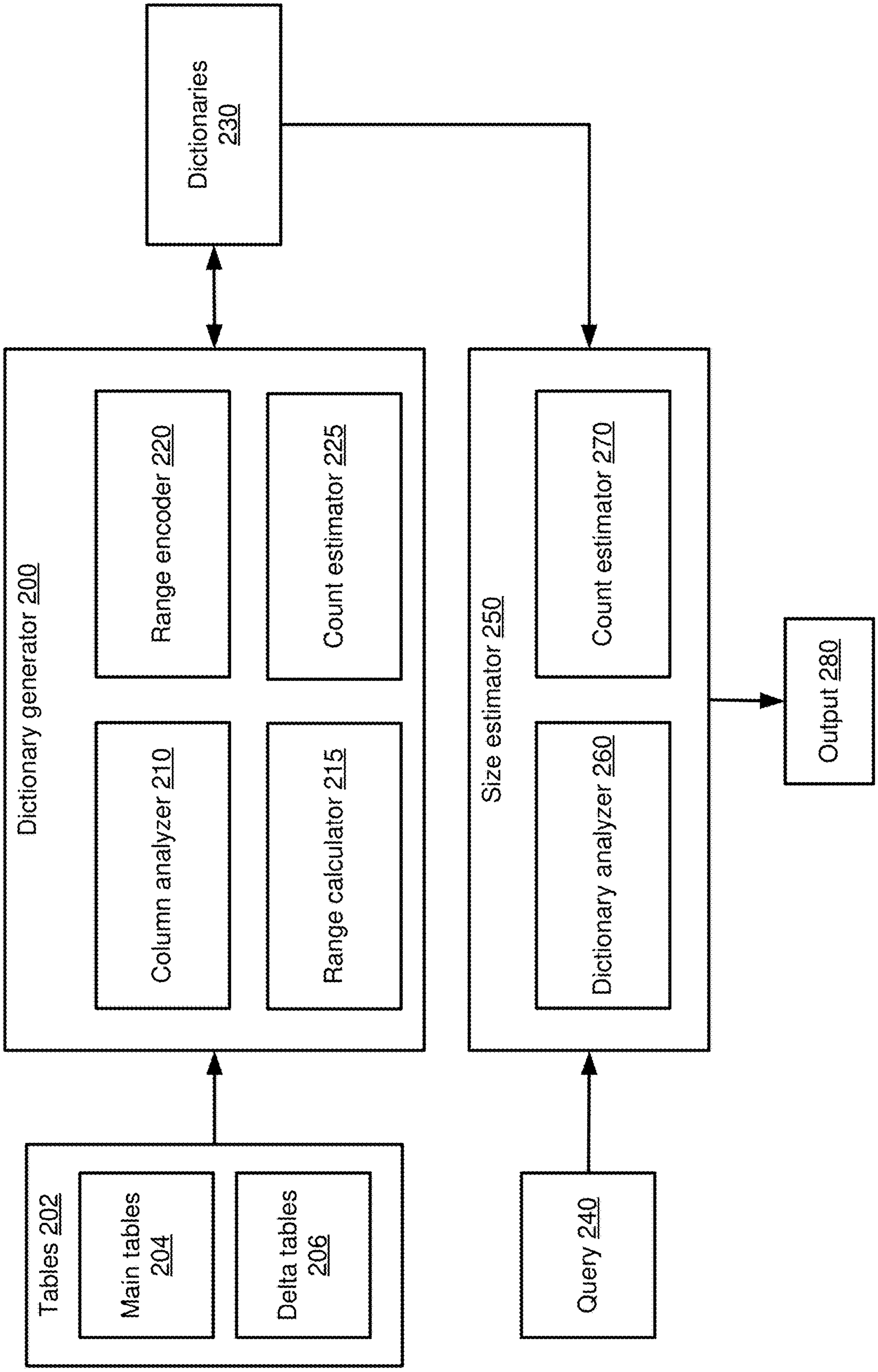
FIG. 2 is a block diagram depicting example components and operations for constructing dictionaries and using the same for improved join size estimation.

FIG. 2 is a block diagram depicting example components and operations for constructing dictionaries and using the same for improved join size estimation.

In some examples, a dictionary generator 200 can be used to generate dictionaries 230 for respective columns of database tables 202. In some examples, each dictionary 230 is created for a selected column of a database table 202, where the dictionary 230 includes a plurality of distinct or unique values found in that column along with a value indicating or approximating the corresponding count for each distinct or unique value. In the dictionary 230, each distinct or unique value can be assigned a unique value identifier ("value id" or simply "vid"). In some examples, the dictionary 230 can be ordered to facilitate more efficient search and retrieval operations (e.g., during join size estimation, as described below). For example, the plurality of distinct or unique values in the dictionary for the selected column can be ordered alphabetically if the values are text-based or numerically if they are numeric.

A size estimator 250 can be used to estimate the join size of a query 240 which may involve two or more columns from different tables 202. Specifically, the size estimator 250 can be configured to utilize the dictionaries 230 corresponding to those columns to estimate the join size. In some examples, based on the dictionaries 230, the size estimator 250 can also generate a join histogram characterizing the distribution of join results of the query 240. In some examples, the size estimator 250 can also be used to estimate the output size of a filter included in the query 240.

In some examples, the dictionary generator 200 can be a separate component of the query processing engine 130. In some examples, the dictionaries 230 can be created a priori (e.g., before executing queries involving the tables 202) and stored in the in-memory data store 124 and/or the persistence layer 126. This allows for the dictionaries 230 to be retrieved directly from the storage locations during query processing, thereby reducing the computational overhead and latency associated with on-the-fly dictionary generation. In other examples, the dictionaries 230 can be created dynamically or on-demand during query join size estimation. In some examples, the size estimator 250 can be a component of the query optimizer 160.

As shown in FIG. 2, the dictionary generator 200 can include a column analyzer 210 and a range encoder 220. The column analyzer 210 can be configured to analyze a given column of a database table 202 to obtain data statistics of the selected column. For example, the column analyzer 210 can identify the distinct or unique values in the given column and determine the count of each distinct or unique value. In some examples, the column analyzer 210 can also obtain additional statistics for the given column, such as the minimum and maximum values, null value count, etc.

The range encoder 220 is configured to encode the count of each distinct or unique value in the given column by mapping it to a specific range index. This range index represents a particular range, defined by lower and upper bounds, associated with each distinct or unique value.

In the dictionary 230 generated for the given column, each distinct or unique value can be assigned a unique value identifier ("vid"). Additionally, each distinct or unique value can be paired with a range index that corresponds to the count of that distinct or unique value within the given column. In other words, the count of each distinct or unique value in the given column is mapped to a specific range associated with the range index paired with the distinct or unique value.

The query 240 can specify a join operation that joins a first table with a second table based on matching values in a selected column of the first table with values in a selected column of the second table. In order to estimate the output size of the join operation, the size estimator 250 first retrieves relevant dictionaries 230 for both columns involved in the join.

As shown in FIG. 2, the size estimator 250 can include a dictionary analyzer 260 and a count estimator 270. The dictionary analyzer 260 can be configured to analyze the retrieved dictionaries of relevant columns to identify matching values that are present in both dictionaries. For each matching value, the dictionary analyzer 260 can also retrieve the corresponding range indices from both dictionaries.

The count estimator 270 can estimate the count of each matching value in the selected column of the first table by using the range indices from its corresponding dictionary. Similarly, the count estimator 270 can estimate the count of the same matching distinct value in the selected column of the second table using the range indices from its corresponding dictionary. The count estimator 270 can calculate the join size by first multiplying the estimated count of each matching value in the selected column of the first table by the estimated count of the same matching value in the selected column of the second table. Then, the count estimator 270 can add up the products to obtain the overall estimated join size, which can be produced as an output 280 of the size estimator 250.

Besides estimated join size, the output 280 of the size estimator 250 can include other information. For example, the output 280 can include distinct value count (dcount) which can be used later on for the estimation of other operations like GROUP BY. Additionally, the output 280 can include a join histogram characterizing distribution of results of the join operation. As another example, the output 280 can include an estimated output size of a filter specified in the query 240. Example use cases illustrating estimation of join size, distinct value count, join histogram, and filter size are described further below.

Example Range Encodings

In some examples, the range encoder 220 can apply a logarithmic function to map a count for each distinct or unique value (representing the frequency that the value appears in a table column) to a corresponding range index, thereby representing the count in a compact, efficient format. In one specific example, the range index for a count can be calculated using the following mapping function: $f(\text{count}) = \lfloor \log_b(\text{count}) \rfloor$, where b is a predefined base and $\lfloor\ \rfloor$ is the floor operator. In other words, the range index corresponding to count can be calculated as the greatest integer less than or equal to a logarithm of count to the base b.

This logarithmic transformation enables the encoding of large counts in a reduced number of bits, minimizing space overhead. For example, with a base b=1.2, 8 bits ($2^8=256$) are sufficient to represent a count for each distinct or unique value for tables with up to $2^{64}$ rows, as $1.2^{256}>2^{64}$. In other words, the count (of each distinct or unique value) is compressed (via the encoding) to a value (range index) that is asymptotically the logarithm of the count in the predefined base. This approach can be particularly effective for large databases, as it can significantly reduce memory usage by storing counts in a log scale, allowing efficient handling of high row counts without requiring a linear increase in storage space in row counts. For instance, instead of using a standard 8-byte (64-bit) long-long integer to store a count for each distinct or unique value, a range index with only one byte (8 bits) can approximately represent the count when using a logarithmic scale with a base b=1.2. When creating dictionaries across many columns of many large tables, this log-based encoding can provide substantial memory savings compared to storing raw integer counts.

In some examples, the range encoder 220 can use alternative mapping functions (e.g., linear functions, polynomial functions, etc.), other than log-based transformations, to map counts of distinct or unique values to respective range indices. In one particular example, no mapping function is applied at all. Instead, the distinct or unique values can be directly paired with their corresponding counts in the dictionaries 230, with each distinct or unique value being associated with a count in its raw form.

Example Ranges Associated with Range Indices

In some examples, the dictionary generator 200 can include a range calculator 215, which can be configured to pre-calculate ranges associated with different range indices.

In some examples, the range calculator 215 can iteratively determine ranges associated with corresponding range indices. Each range index represents a distinct range, and consecutive range indices represent consecutive, non-overlapping ranges. Each range can be defined by a lower bound and an upper bound. The lower bound of a subsequent range is equal to one more than the upper bound of a preceding range.

For example, the range encoder 220 can encode the counts of distinct or unique values in an asymptotically logarithmic manner based on the range calculator 215. Denote $[l_i, r_i]$ as the i-th range for i=0 to $2^k-1$ for k-bit encoding, where $l_i$ and $r_i$ represent the lower bound and upper bound of the range. The ranges associated with different range indices i can be pre-calculated based on the following pseudocode:

$$[l_0, r_0] = [0, 0]$$

$$\text{For } i = 1 \text{ to } 2^k - 1:$$

$$l_i = r_{i-1} + 1$$

$$r_i = \lfloor l_i * b \rfloor$$

It can be shown that asymptotically, $$l_i = O(b^i)\frac{r_i}{l_i} = b + O(1).$$

Here, O is the asymptotic notation, which describes the growth rate of a function as i becomes large. For the lower bound $l_i$, $O(b^i)$ indicates that $l^i$ grows approximately proportionally to $b^i$. For the ratio $$\frac{r_i}{l_i}, b + O(1)$$

means that this ratio approaches b asymptotically, with a difference that is bounded by a constant. To see $l_i=O(b^i)$, note that $$l_i = \lfloor l_{i-1} * b + 1 \rfloor \le b(l_{i-1}+1) \le b^{i-1}l_1 + b^{i-1} + b^{i-2} + \ldots + b = b^{i-1}l_1 + \frac{b^i - b}{b-1},$$

leading to an upper bound $$\frac{2}{b-1}$$

for the constant factor of the leading term. For the ratio $$\frac{r_i}{l_i},$$

it stays within the range $$b - \frac{1}{l_i} < \frac{r_i}{l_i} \le b.$$

For example, assume b=1.2, the first few ranges can be calculated as follows:

| i | $b^i$ | $l_i$ | $r_i$ |
|---|---|---|---|
| 0 | 1.0 | 0 | 0 |
| 1 | 1.2 | 1 | 1 |
| 2 | 1.44 | 2 | 2 |
| 3 | 1.73 | 3 | 3 |
| 4 | 2.07 | 4 | 4 |
| 5 | 2.49 | 5 | 6 |
| 6 | 2.99 | 7 | 8 |
| 7 | 3.58 | 9 | 10 |
| 8 | 4.3 | 11 | 13 |
| 9 | 5.16 | 14 | 16 |
| 10 | 6.19 | 17 | 20 |
| 11 | 7.43 | 21 | 25 |
| 12 | 8.92 | 26 | 31 |
| 13 | 10.7 | 32 | 38 |
| 14 | 12.84 | 39 | 46 |
| 15 | 15.41 | 47 | 56 |
| 16 | 18.49 | 57 | 68 |
| 17 | 22.19 | 69 | 82 |
| 18 | 26.62 | 83 | 99 |
| 19 | 31.95 | 100 | 120 |
| . . . | . . . | . . . | . . . |

When performing range encoding, the range encoder 220 can compute the mapping function $f(x)$ by setting $f(x)=i$ such that $x \in [l_i, r_i]$, meaning finding the range index i for which x lies within the range or interval $[l_i, r_i]$. This computation can take O(k) time if done using binary search across the $2^k$ intervals. Alternatively, it can be optimized to O(1) time by first taking the logarithm of x, which reduces the search range, followed by a quick sequential search (within a constant step) to locate the appropriate interval.

With the above asymptotic bounds, the encoding is an asymptotically logarithmic transformation. We also have $f(x) \le \lceil \log(x) \rceil$, meaning that, as in the logarithmic encoding, for example, with a base b=1.2, 8 bits are sufficient to represent a count for each distinct or unique value for tables with up to $2^{64}$ rows.

Example Table Storage and Dictionary Update

In some examples, database tables 202 can be stored in the data storage 190. In some examples, database tables 202 can be stored in the in-memory data store 124 and/or the persistence layer 126.

In some examples, database tables 202 include main tables 204 and corresponding delta tables 206, which can share the same schema. In some examples, main tables 204 can be optimized for read operations and store the primary dataset, typically in a compressed format to save memory and accelerate searches and calculations. While compression allows efficient data storage and faster queries, it can make direct modifications costly. To enable efficient write operations, delta tables 206 can be used as a separate structure configured to log changes made to the main tables. In some examples, delta tables 206 can use basic compression and act as a buffer for recent inserts, updates, and deletions, allowing modification of data without impacting the main tables 204. Write operations can be directed solely to the delta tables 206, while read operations can access both main tables 204 and delta tables 206 to provide a complete view of the data. Periodically or intermittently, a merge operation (also referred to as "delta merge") can be performed to consolidate changes from the delta tables 206 into the corresponding main tables 204, recalculating compression as needed and truncating delta logs to optimize storage and maintain performance.

In some examples, the dictionaries 230 can be created based on columns in the main tables 204, and then periodically or intermittently updated to reflect changes logged in the corresponding delta tables 206.

For example, after a merge operation between a main table 204 and its corresponding delta table 206, the dictionaries 230 created based on columns of the main table can be updated to reflect changes in the dataset. Both the distinct or unique values and their counts may change during the merge.

When new records are added from the delta table 206, new distinct or unique values may be introduced. For instance, if the delta table 206 contains a record with a previously unseen value for a given column, that distinct or unique value can be added to the dictionary for the given column with an initial count of one. Additionally, when multiple records containing an existing distinct or unique value for the given column are added, the count for that distinct or unique value in the merged table will increase, and the range index associated with that distinct or unique value needs to be updated in the dictionary for the given column to reflect the increased count.

Conversely, when records containing an existing distinct or unique value for a given column are deleted (as indicated by the delta table 206), the count for that distinct or unique value in the merged table will decrease, and the range index needs to be updated in the dictionary for the given column to reflect the reduced count. If the reduced count for a distinct or unique value reaches zero (e.g., all records of that distinct or unique value are deleted), that distinct or unique value needs to be removed entirely from the dictionary for the given column.

In some examples, after merging the main table 204 and its corresponding delta table 206, the dictionary 230 for a given column can be updated based on scanning the merged table (or both the main table 204 and the delta table 206) to count all distinct or unique values in the given column. Specifically, all distinct or unique values in the given column can be identified from the merged table, and their respective counts can be accurately determined. The count of each distinct or unique value can be mapped to a range index, as described above. The dictionary 230 can be updated to include all distinct or unique values identified from the merged table and their corresponding range indices. Thus, the range indices in the updated dictionary for the given column reflect the actual counts of distinct or unique values in the given column of the merged table. The updated dictionary 230 can be ordered, as described above.

In some examples, the count of each distinct or unique value does not need to be accurately tracked and can be approximately maintained by range indices instead, thereby further optimizing performance. For example, the dictionary generator 200 can also include a count estimator 225. While rebuilding the dictionary 230, range indices can be updated by the count estimator 225. Example methods for updating range indices of the dictionary are described further below (see, e.g., method 500).

In some examples, after merging the main table 204 and its corresponding delta table 206, the dictionary 230 for a given column can be updated without scanning the merged table (or both the main table 204 and the delta table 206). Instead, only the delta table 206 needs to be scanned to update the dictionary 230. For example, using the count estimator 225 in the dictionary generator 200, the dictionary 230 can be maintained as a tree-like data structure to allow efficient insertions and deletions. Instead of directly identifying and counting distinct or unique values in a given column of the merged table, the count estimator 225 can be used to determine the distinct or unique values and estimate their respective counts based on an existing dictionary (previously created based on the main table) for the given column and data in the delta table. For instance, after new data is inserted into the delta table, distinct or unique values added in the delta table and their counts can be incorporated into the dictionary for the given column. Similarly, deletions or updates can be reflected through changes to the counts of existing distinct or unique values. Likewise, the updated dictionary 230 can be ordered, as described above.

In this approach, the time overhead of updating the dictionary is proportional to the row count of the delta table, as it only requires scanning the delta table for new data. Since the existing dictionary already holds the range indices representing counts of distinct or unique values in the main table, there is no need to rescan the main table, allowing the counts of distinct or unique values in the main table to be estimated directly from the dictionary. Thus, this approach allows for more efficient updates to the dictionaries 230.

In some examples, the dictionaries 230 can be updated periodically or intermittently without waiting for a full merge of the main tables 204 and their corresponding delta tables 206. For example, the count estimator 225 can estimate counts of distinct or unique values in the main table 204 based on an existing dictionary, and then adjust the counts based on changes to the distinct or unique values recorded in the delta table 206. The adjusted counts can be mapped to corresponding range indices, as described above. The dictionary can be updated to include the range indices representing the adjusted counts. Similarly, the dictionary can be ordered. Example methods for updating range indices of the dictionary are described further below (see, e.g., method 500).

Example Overall Method for Estimating Output Size of Table Join Operations

Figure 3:
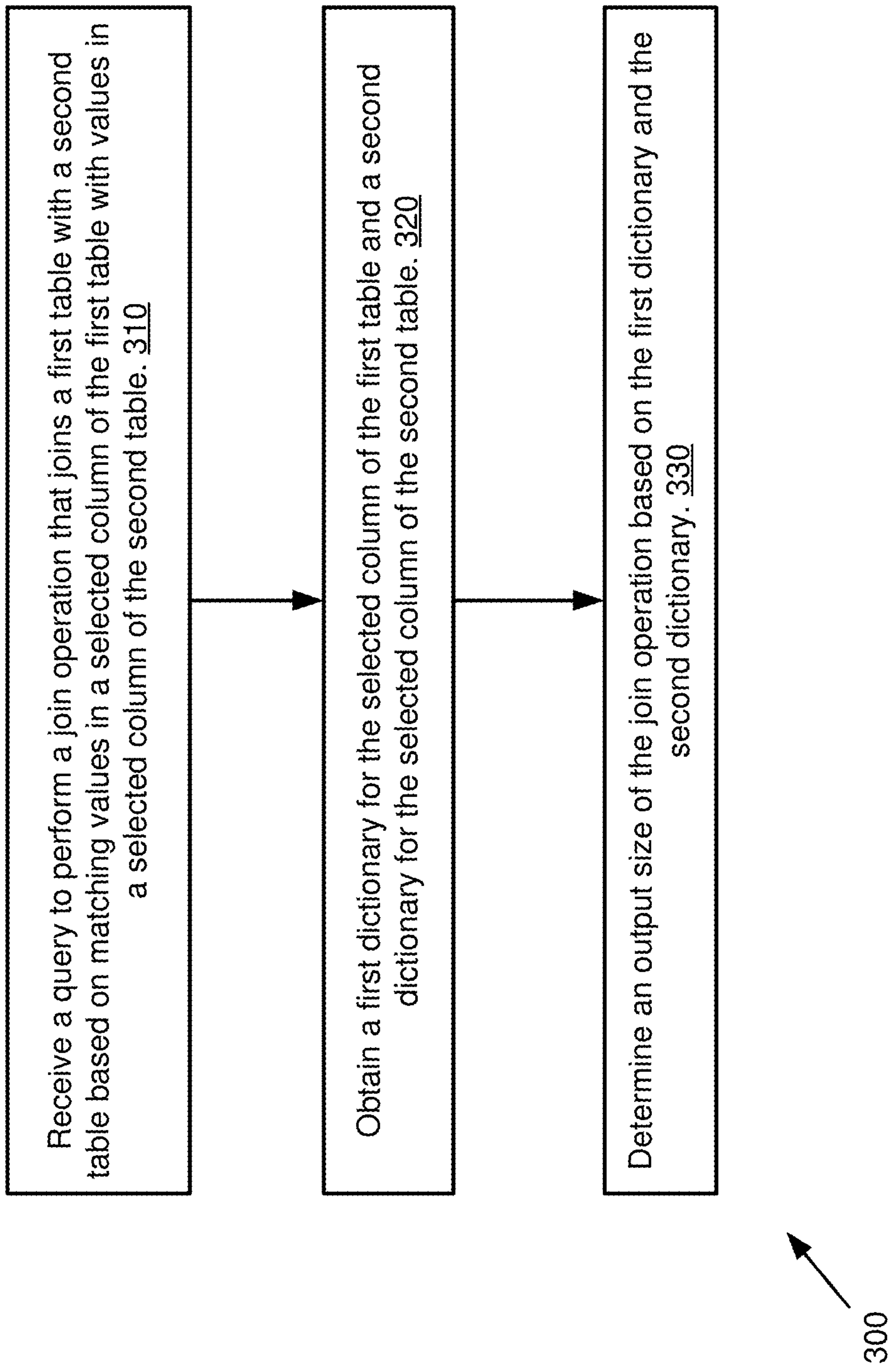
FIG. 3 is a flowchart illustrating an example overall method for performing improved join size estimation.

FIG. 3 is a flowchart illustrating an overall method 300 of estimating query join size using dictionaries, and can be performed, for example, by the size estimator 250 of FIG. 2.

At step 310, the method 300 can receive a query to perform a join operation that joins a first table with a second table based on matching values in a selected column of the first table with values in a selected column of the second table.

At step 320, the method 300 can obtain a first dictionary for the selected column of the first table and a second dictionary for the selected column of the second table. As described above, a dictionary for a given column includes a plurality of distinct or unique values in the given column and corresponding range indices. A count of a given distinct or unique value in the given column is mapped to a range associated with a range index corresponding to the given distinct or unique value.

Then at step 330, the method 300 can determine an output size of the join operation based on the first dictionary and the second dictionary.

The method 300, and any other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Example Method for Estimating Join Size Based on Dictionaries

Figure 4:
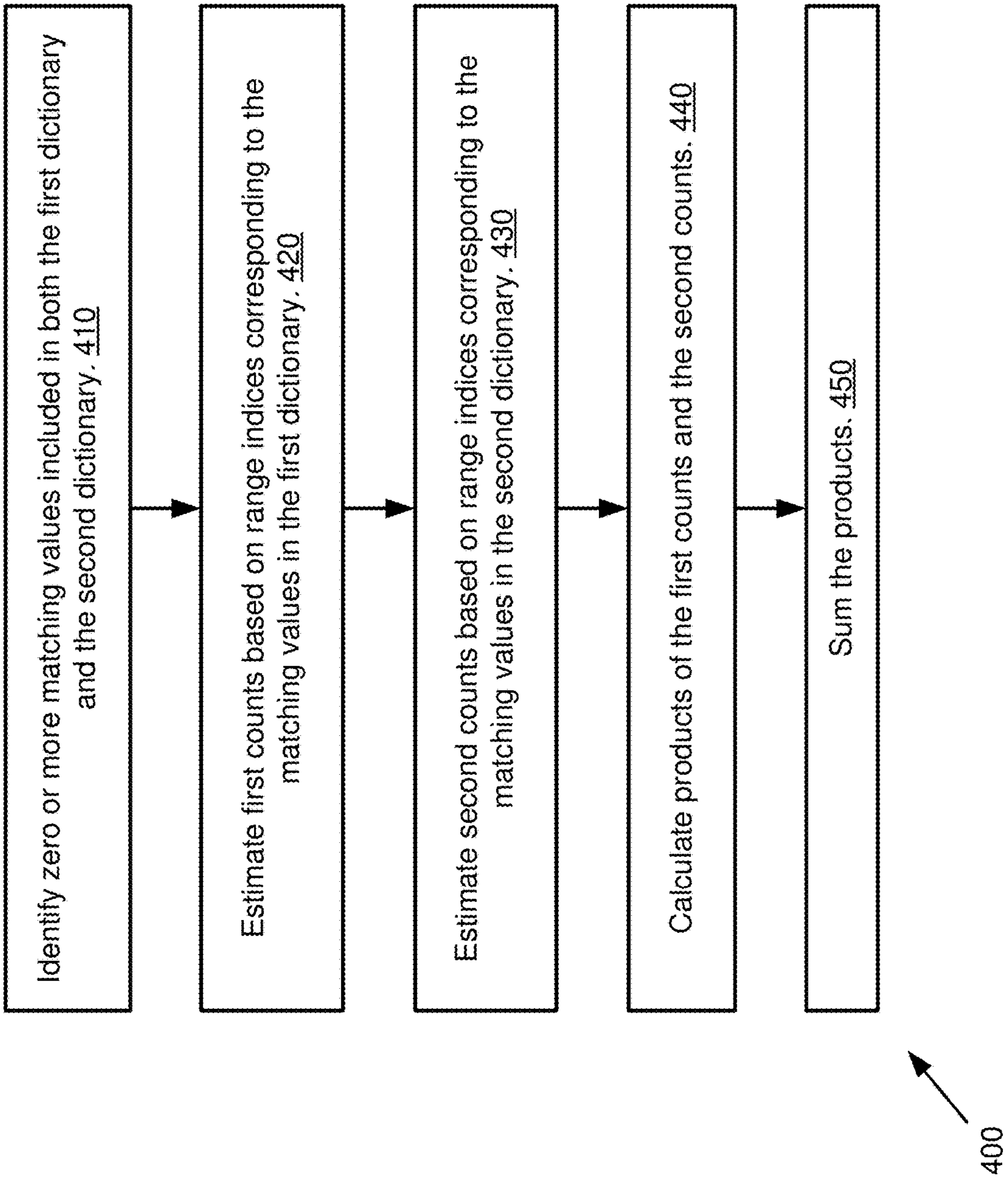
FIG. 4 is a flowchart illustrating an example method for estimating join size based on two dictionaries.

FIG. 4 is a flowchart illustrating an example method 400 for estimating join size based on two dictionaries, such as the first and second dictionaries obtained at step 320 above. The method 400 can implement step 330 of the method 300.

At step 410, the method 400 can identify zero or more matching values included in both the first dictionary and the second dictionary.

At step 420, the method 400 can estimate first counts based on range indices corresponding to the matching values in the first dictionary.

At step 430, the method 400 can estimate second counts based on range indices corresponding to the matching values in the second dictionary.

At step 440, the method 400 can calculate products of the first counts and the second counts (e.g., for each matching value, calculating a product of the corresponding first count estimated based on the first dictionary and the second count estimated based on the second dictionary).

Then, at step 450, the method 400 can sum the products. The sum can be output as the estimated join size.

Estimating a count based on a given range index (e.g., at step 420 and/or step 430) can be performed, for example, by the count estimator 270 of FIG. 2.

In some examples, the count for a given range index can be estimated based on calculating a geometric mean of a lower bound and an upper bound of the range associated with the given range index. For instance, for a given range index i, which is associated with a range $[l_i, r_i]$, the estimated count for this range index can be calculated as $\sqrt{l_i r_i}$. It can be shown that the estimated count $\sqrt{l_i r_i}$ has a q-error bounded by max (O(1), O(b)) with high probability. Combined with $$\frac{r_i}{l_i} = b + O(1),$$

it follows that the join size estimation has a bounded q-error of max (O(1), $O(b^2)$) with high probability. For example, with a base b=1.2, it can be shown that the join size estimation can be maintained with a q-error of 10.

The implementation of method 400 can take into account data changes logged in delta tables. As described above, dictionaries can be created based on data columns in main tables, while modification of data can be logged in corresponding delta tables. For example, the first dictionary can be created based on the selected column of a first main table, and the second dictionary can be created based on the selected column of a second main table. Changes to the first main table can be logged in a first delta table, and changes to the second main table can be logged in a second delta table. To accurately estimate the join size, the first counts estimated at step 420 and the second counts estimated at step 430 need to reflect changes to matching values logged in the first and second delta tables, respectively.

For example, suppose that one of the matching values in a given column is v, and its corresponding range index in the (first or second) dictionary is i, representing the range $[l_i, r_i]$. In one example, the corresponding delta table may indicate that there are $n_{delta}$ rows containing v in the given column are added to the corresponding main table. Then, the estimated count for this range index can be calculated as $\hat{n}_v = \sqrt{l_i r_i} + n_{delta}$. In other words, the estimated count for this range index combines the geometric mean of the lower and upper bounds with the number of additional rows containing v as logged in the delta table, ensuring that the join size estimation accurately reflects both the main table data and recent changes recorded in the delta table. In another example, the corresponding delta table may indicate that there are $n_{delta}$ rows containing v in the given column are removed from the corresponding main table. In this case, the estimated count for this range index can be calculated as $\hat{n}_v = \max(\sqrt{l_i r_i} - n_{delta}, 0)$. In other words, the estimated count for this range index is adjusted by subtracting the number of rows removed, as indicated by the delta table, from the geometric mean of the range bounds, ensuring that the join size estimation accounts for deletions and does not result in a negative count by applying a minimum value of zero. The adjustment of estimated count for each range index based on corresponding delta tables can be performed for each of the matching values in step 420 and step 430 above.

The following pseudocode further illustrates an example implementation of the method 400, which can be considered as a modification to merge join. Let c1 be a column of the first table T1 and c2 be a column of the second table T2. The query joins T1 and T2 with a predicate T1.c1=T2.c2. Further denote c1 has an ordered dictionary $d_1$: vid $\mapsto$ (v, i) of size $m_1$ (i.e., the number of distinct or unique values in the column c1 is $m_1$), and denote c2 has an ordered dictionary $d_2$: vid $\mapsto$ (v, i) of size $m_2$ (i.e., the number of distinct or unique values in the column c2 is $m_2$). Here, the notation of $d_1$ and $d_2$ indicates a mapping from each distinct or unique value identifier (vid) to the corresponding distinct value (v) and the range index (i).

$$\text{Initialize: } vid_1 = 1,\ vid_2 = 1,\ dcount = 0,\ \text{count} = 0$$
$$\text{While } vid_1 \le m_1 \text{ and } vid_2 \le m_2\text{:}$$
$$\text{Let } (v_1, i_1) = d_1(vid_1),\ (v_2, i_2) = d_2(vid_2)$$
$$\text{If } v_1 < v_2,\ vid_1 = vid_1 + 1 \text{ and continue}$$
$$\text{If } v_2 < v_1,\ vid_2 = vid_2 + 1 \text{ and continue}$$
$$dcount = dcount + 1$$
$$\text{count} = \text{count} + \hat{n}_{v_1}\hat{n}_{v_2}$$
$$vid_1 = vid_1 + 1,\ vid_2 = vid_2 + 1$$

In this pseudocode, $vid_1$ and $vid_2$ are indices iterating through dictionaries $d_1$ and $d_2$, respectively, to identify matching values (that is, $v_1 = v_2$). The while loop continues until all matching values are processed. For each matching value pair $(v_1, i_1)$ and $(v_2, i_2)$, a distinct value count ("dcount") is incremented to track the number of matching values encountered. The final distinct value count can be used later on the estimation of other operations like GROUP BY. The estimated counts $\hat{n}_{v_1}$ and $\hat{n}_{v_2}$ for each matching value are respectively calculated based on geometric means of the lower and upper bounds of corresponding ranges (and adjusted based on corresponding delta tables, if needed), as described above. The estimated counts $\hat{n}_{v_1}$ and $\hat{n}_{v_2}$ for each matching value are then multiplied, and their product ($\hat{n}_{v_1}\hat{n}_{v_2}$) is added to count. The final count holds the estimated join size, representing the total sum of these products.

In some examples, a join histogram can be created based on above calculations. For example, the join histogram can include entries for each identified matching value, where each entry records the value itself along with its count, estimated as the product $\hat{n}_{v_1}\hat{n}_{v_2}$.

Although geometric means are described above as examples for estimating a count for a given range index, the count can alternatively be estimated using other methods. For instance, the median value of the range $[l_i, r_i]$ can be selected to represent a count estimate. Alternatively, a number within the range $[l_i, r_i]$ can be randomly chosen (assuming a uniform count distribution within the range) to represent the count estimate. Other count estimation approaches can also be used.

Example Method for Updating Range Indices of Dictionaries

Figure 5:
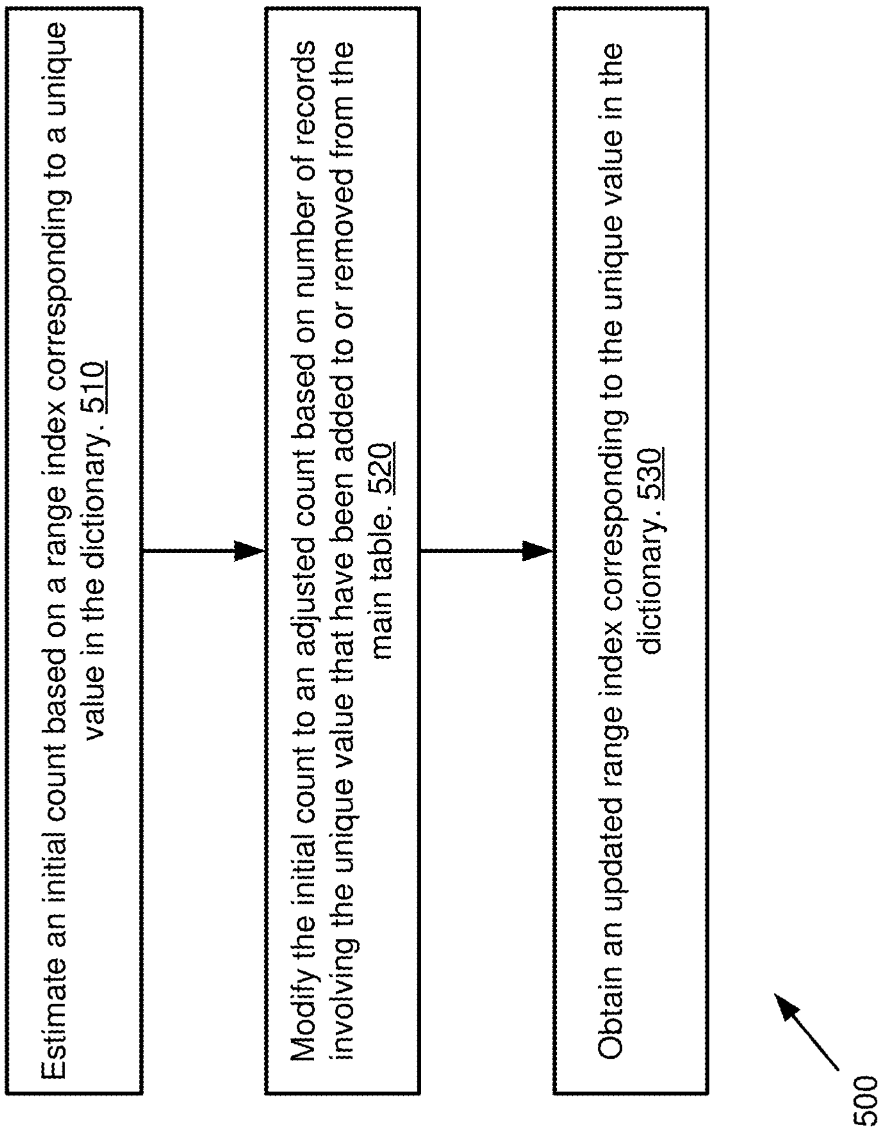
FIG. 5 is a flowchart illustrating an example method for updating a dictionary.

As described above, dictionaries can be updated after merging the main tables with their corresponding delta tables. FIG. 5 is a flowchart illustrating an example method 500 for updating a dictionary that was previously created based on a column of a main table, by incorporating data from a delta table corresponding to the main table without scanning the main table.

At step 510, the method 500 estimates an initial count based on a range index corresponding to a distinct or unique value in the dictionary.

Estimating the initial count can be performed, for example, by the count estimator 225 of FIG. 2. In some examples, the initial count can be randomly selected from the range associated with the range index (assuming a uniform count distribution within the range).

At step 520, the method 500 can modify the initial count to an adjusted count based on the number of records involving the distinct or unique value that have been added to or removed from the main table, for example, as being logged by the delta table.

At step 530, the method 500 can obtain an updated range index corresponding to the distinct or unique value in the dictionary. The adjusted count is mapped to the range associated with the updated range index.

The steps 510 through 530 can be repeated for each distinct or unique value logged in the delta table. In some examples, a dictionary on the delta table is generated and maintained to optimize the process.

To further illustrate the method 500, suppose that for a distinct or unique value v in a dictionary (created based on a given column of a main table), there are $n_{delta}$ rows in the corresponding delta table that contain v (in the given column). In the main table, the dictionary maps a distinct or unique identifier vid to the pair (v, i), where i represents a range index for the distinct or unique value v. The initial count $n_{main}$ for the distinct or unique value v can be selected randomly from the range $[l_i, r_i]$ (assuming a uniform count distribution within the range) defined by the range index i (step 510).

Next, an adjusted count can be calculated (step 520) as $n_{main}+n_{delta}$, which represents the estimated total count after accounting for records involving v that have been added to the delta table. This adjusted count can then be transformed (e.g., by the range encoder 220) to update the range index for v (step 530). For example, an updated range index can be obtained by applying a mapping function, such as the logarithmic function described above to the adjusted count, that is, $f(n_{main}+n_{delta})$. This updated range index can then be saved in the dictionary.

On the other hand, if the delta table indicates that $n_{delta}$ rows with the value v have been deleted, a similar approach is used, but the adjusted count can be calculated as max $(n_{main}-n_{delta}, 0)$. This ensures that the adjusted count remains non-negative, effectively handling record deletions in the delta table by reducing the count for the value v without causing it to fall below zero. Similarly, this adjusted count can be transformed (e.g., by applying the logarithmic mapping function described above) to update the range index for v in the dictionary.

Alternatively, steps 510 through 530 can be repeated for each value v logged in the delta table while scanning the delta table. Suppose the dictionary for the main table contains the range index i for the value v. The initial count $n_{main}$ for the distinct or unique value v can be selected randomly from the range $[l_i, r_i]$ defined by the range index i (assuming a uniform count distribution in the range). An updated range index can be obtained by $f(n_{main}+1)$. Upon finishing scanning the delta table, for each distinct or unique value v, steps 510 through 530 can be repeated $n_{delta}$ times where $n_{delta}$ is the number of rows in the corresponding delta table that contain v (in the given column).

In some examples, the above approach can be applied to efficiently rebuild dictionaries upon delta merges only using range indices without temporarily storing accurate counts for each distinct or unique value.

Randomly selecting the initial count from a range represented by a range index can ensure an unbiased estimate across multiple delta merges. It can be shown that by selecting values randomly within the range $[l_i, r_i]$ having a uniform count distribution, the estimated count can be maintained, for example, by above method, with a q-error bounded by max (O(1), O(b)) with high probability. For example, with a base b=1.2, it can be shown that the estimated count can be maintained with a q-error of 3.

Alternatively, the initial count for a distinct or unique value with a corresponding range index can be estimated using other methods, such as the geometric mean of the range, the median of the range, etc.

Example Method for Estimating Output Size of Query Filters

Figure 6:
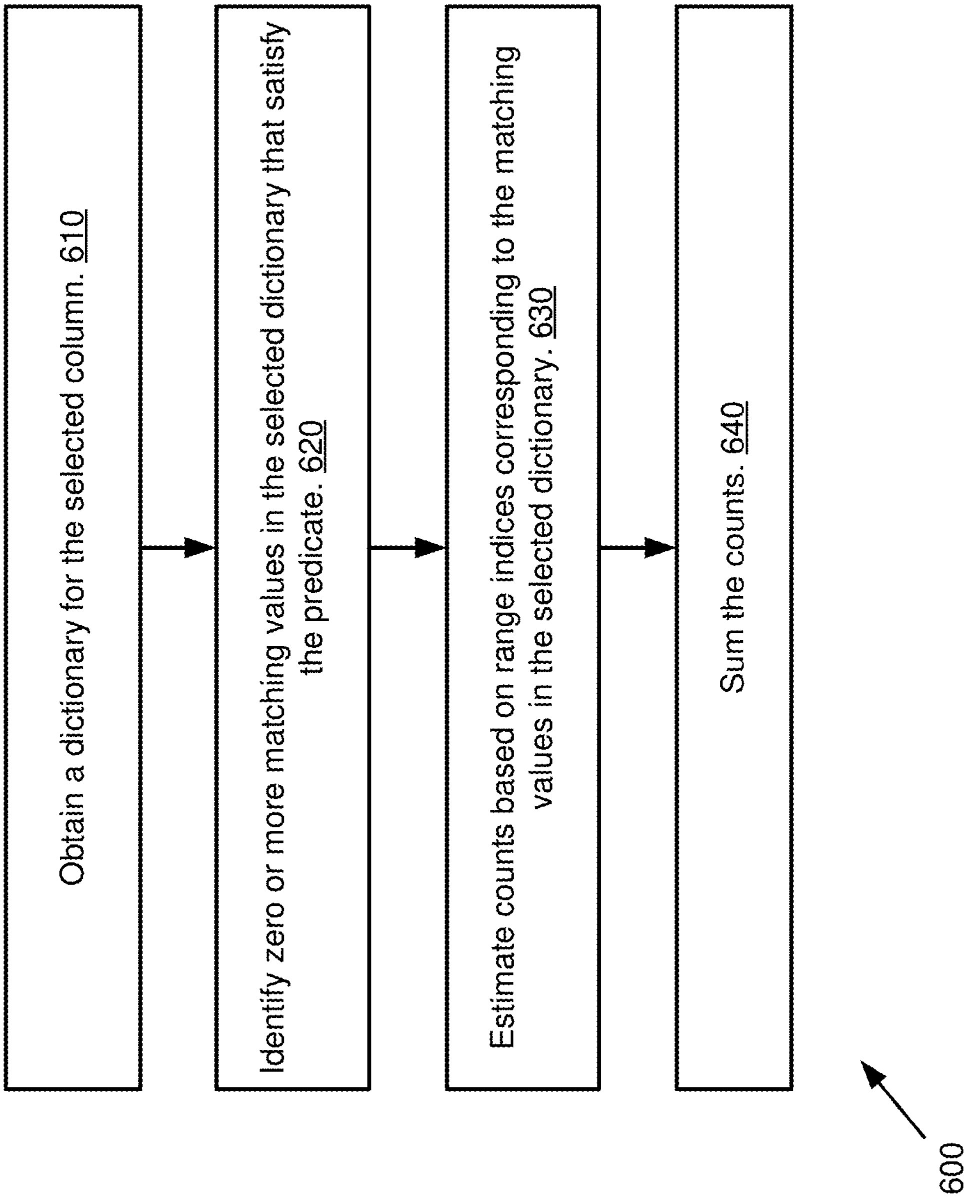
FIG. 6 is a flowchart illustrating an example method for estimating an output size of a query filter.

In some examples, the size estimator 250 of FIG. 2 can also estimate an output size of a filter of the query 240. The filter can specify a predicate evaluating values in a selected column of a selected table. FIG. 6 is a flowchart illustrating an example method 600 for estimating the output size of the filter.

At step 610, the method 600 can obtain a dictionary for the selected column.

At step 620, the method 600 can identify zero or more matching values in the dictionary that satisfy the predicate.

At step 630, the method 600 can estimate counts based on range indices corresponding to the matching values in the dictionary.

For example, one method to estimate the count for each matching value is to calculate the geometric mean of the range bounds associated with the range index, as described above. Other methods (e.g., selecting the median of the range, randomly sampling within the range, etc.) can also be used to estimate the counts for each matching value. In addition, adjustments can be made to these estimated counts to account for entries in the delta tables. For example, after initially estimating the count for each matching value, the count can be increased or decreased based on numbers of records involving the matching value recorded in the delta table, as described above.

Then, at step 640, the method 600 can sum the counts. The calculated sum can be deemed as the output size of the filter.

Example Dictionaries

As one example, FIG. 7 shows a partial main table 700 and a partial delta table 710 corresponding to the main table 700, each having a Country column and a City column. An example dictionary 730 corresponds to the City column of the main table 700.

To create the dictionary 730, distinct or unique values in the City column of the main table 700 can be identified and the count of each distinct or unique value can be determined (e.g., by the column analyzer 210). Each distinct or unique value can be assigned a unique value identifier ("vid"). For example, Berlin is assigned a vid=1, Paris is assigned a vid=3, etc.

A data vector 720 can represent the City column of the main table 700 based on the dictionary 730. For example, each row of the main table 700 can have a row identifier ("rid"). Each value in the City column of the main table 700 can be represented by its corresponding vid defined in the dictionary 730. Thus, the City column of the main table 700 can be represented by the data vector 720, consisting of a plurality of vid's, along with the dictionary 730 to look up corresponding value from each vid. This data vector 720 can be used in queries to quickly access and filter data based on the unique value identifiers instead of scanning the full column data directly, improving query efficiency and reducing memory usage by referencing the compact representations in the data vector 720.

The dictionary 730 also includes a range index (denoted as $f$(count)) for each of the distinct or unique value, or vid. As described above, the range index for a distinct or unique value can be determined by applying the mapping function to the count of the distinct or unique value, such as the logarithmic function described above. In this example, it is assumed that the main table 700 includes 40 rows for Berlin and 12 rows for Paris in the City column. Assume the base b is set to 1.2. Thus, the range indices for Berlin and Paris are calculated as 14 and 8 (see Table in the section "Example Ranges Associated with Range Indices"), respectively. The range indices for other distinct or unique values can be similarly calculated.

In some examples, the dictionary 730 can be updated by identifying the distinct or unique values in the City column across both the main table 700 and the delta table 710 and counting their occurrences. The updated counts can be used to adjust the range indices in the dictionary 730. In some examples, the method for updating the dictionary 730 may depend on whether a delta merge is performed.

During a delta merge (e.g., when the delta table 710 is merged with the main table 700), the dictionary 730 can be rebuilt. For example, if the delta table 710 indicates 10 rows for Berlin are added, the total count for Berlin will be 50 and its corresponding range index will be updated to 15 which is associated with the range [47, 56]. Similarly, if the delta table 710 indicates rows containing new distinct or unique values (e.g., San Francisco, Vancouver, etc.) are added, then these new distinct or unique values will be assigned respective unique identifiers, and their counts will be converted to respective range indices in the dictionary 730. As another example, if the delta table 710 indicates 4 rows of Paris are removed, the total count for Paris will be 8 and its corresponding range index will be changed to 6 by applying the above mapping function. Similarly, if the delta table 710 indicates a row for Rome is removed, the count for Rome will be zero, and the entry corresponding to Rome will be removed from the dictionary 730 (since the count of Rome in the main table 700 is one).

In some examples, instead of keeping exact counts for each distinct or unique value during a delta merge, the count estimation from range indices can be used. For instance, the dictionary 730 indicates that the range index for Berlin is 14, which is associated with the range [39, 46]. Thus, the count of Berlin in the main table 700 ($n_{main}$) can be estimated by randomly selecting a number from the range [39, 46], such as 42 (or any other number within the range). This estimated count ($n_{main}$) can be adjusted based on the number of rows for Berlin that are added or removed in the delta table 710. For example, if five rows containing Berlin are added to the delta table, the estimated count for Berlin would be increased by 5, resulting in an adjusted count of 47. Conversely, if rows containing Berlin are deleted, the estimated count would be decreased accordingly. The range index for Berlin can then be updated in the dictionary 730 by applying the mapping function to the adjusted count, as described above.

On the other hand, without a delta merge, the unique identifiers (vids) in the dictionary 730 cannot be changed because the data vector (e.g., 720) already relies on these existing vids. This means that new distinct or unique values cannot be added to the dictionary 730, nor can existing values be removed, even if their count becomes zero. Instead, only the range indices in the dictionary 730 are updated based on changes recorded in the delta table 710. For instance, if the delta table 710 indicates that rows corresponding to an existing vid have been added or removed, the associated count in the dictionary 730 can be adjusted accordingly, and the range index is recalculated using the above mapping function.

As described above, the dictionary 730 can also be updated without scanning the main table 700 (see, e.g., method 500). For instance, the dictionary 730 indicates that the range index for Berlin is 14, which is associated with the range [39, 46]. Thus, the count of Berlin in the main table 700 ($n_{main}$) can be estimated by randomly selecting a number from the range [39, 46], such as 42 (or any other number within the range). This estimated count ($n_{main}$) can be adjusted based on the number of rows for Berlin that are added or removed in the delta table 710. For example, if five rows containing Berlin are added to the delta table, the estimated count for Berlin would be increased by 5, resulting in an adjusted count of 47. Conversely, if rows containing Berlin are deleted, the estimated count would be decreased accordingly. The range index for Berlin can then be updated in the dictionary 730 by applying the mapping function to the adjusted count, as described above.

Example Use Cases

Several use cases are described herein to further illustrate the usage of dictionaries.

In one example, FIG. 8 shows a first dictionary 800 created from a City column of a first table T1, and a second dictionary 810 created from a City column of a second table T2. In this simplified example, the first dictionary 800 has five entries and the second dictionary 810 has four entries. Each entry has a distinct or unique value, a vid for the unique value, and a corresponding range index ($f$(count)). Consider the following example query:

SELECT*FROM T1, T2 WHERE T1.City=T2.City

The output size of the join operation can be estimated using the method 400 described above. Some intermediate results are shown in table 820. For example, scanning the first dictionary 800 and second dictionary 810 can identify three matching values: Berlin, Paris, and Seoul (step 410). For each matching value, a first count (N1) can be estimated based on the corresponding range index in the first dictionary 800 (step 420), and a second count (N2) can be estimated based on the corresponding range index in the second dictionary 810 (step 430). In the depicted example, N1 and N2 are respectively estimated based on geometric mean of the range bounds associated with the corresponding range indices (e.g., N1 and N2 for Berlin are estimated to be $\sqrt{39\times 46}=42.356$ and $\sqrt{17\times 20}=18.439$, respectively, etc.). The products N1× N2 are calculated (step 440) and listed in the 'count' column. The join size can be estimated as the sum of those products (step 450), which is 794.96 (or rounded to 795) in this example.

In the example depicted in FIG. 8, delta tables corresponding to T1 and T2 are not considered. If there are delta tables logging changes made to T1 and/or T2, the estimated counts N1 and N2 can be adjusted accordingly based on numbers of records involving the matching values recorded in those delta tables, as described above.

Additionally, a join histogram can be created based on table 820 by pairing the identified matching values (in the "value" column) with corresponding calculated products (in the "count" column).

In another example, considering the following query with a filter:

$$\text{SELECT} * \text{FROM } T1 \text{ WHERE } T1.\text{City} = \text{'Berlin'}$$

In this example, the query filter specifies a predicate: T1.City='Berlin'. The output size of this filter can be estimated based on the dictionary 800 (e.g., using method 600). For instance, Berlin can be identified as a matching value that satisfies the predicate (step 620). The count for Berlin can be estimated based on its corresponding range index 14 (step 630), for example, by calculating the geometric mean of the associated range bounds $\sqrt{39 \times 46}=42.36$ (or rounded to 42). In this example, only Berlin satisfies the predicate, thus the estimated filter size is 42. On the other hand, if there are multiple matching values that satisfy the filter predicate, each matching value can have an estimated count based on its range index. The filter size can then be calculated as the sum of these estimated counts (step 640).

In the above example, the delta table corresponding to T1 is not considered. If there is a delta table logging changes made to T1, the estimated count for Berlin can be adjusted accordingly based on numbers of records involving Berlin recorded in the delta table, as described above.

Example Advantages

The technologies described herein offer several technical advantages.

By incorporating dictionaries with range indices (for count approximation), the disclosed solution provides an efficient and scalable method for join size estimation that addresses existing challenges in cost-based query optimization. As described above, traditional methods for estimating join sizes often rely on assumptions of uniform data distribution and optimal matching patterns, leading to inaccurate estimates that can significantly inflate query costs. The disclosed technologies mitigate this issue by using an ordered dictionary structure that retains necessary information for accurately approximating counts of distinct or unique values, enabling accurate join size estimations even when data distributions are highly irregular.

Additionally, the disclosed solution can simplify dictionary maintenance by limiting the scanning overhead to only the delta tables, bypassing the need to rescan main tables. This approach ensures that the time required for dictionary updates is proportional to the row count of the delta table. By avoiding rescanning the main table, this method can provide a more resource-efficient solution for dictionary updates.

Furthermore, the disclosed technologies can guarantee a bounded q-error in join size estimation, which is important for maintaining the efficiency and predictability of query plans. This bound on estimation error can reduce the likelihood of costly query missteps, such as excessive memory allocation or suboptimal join strategies, thereby enhancing the stability and performance of database systems under diverse workloads.

In addition to join size estimation, the disclosed technologies can also be extended to create join histograms and accurately estimate filter sizes. Both features support bounded q-error estimations, offering improved accuracy over conventional histogram and filter estimation methods.

Example Computing Systems

Figure 9:
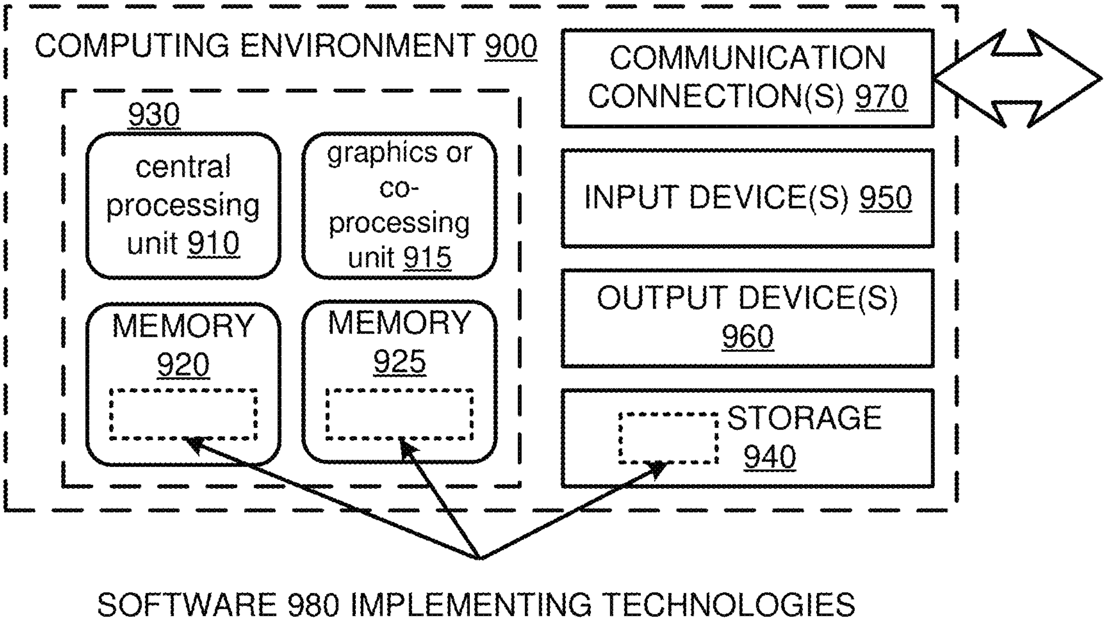
FIG. 9 is a block diagram of an example computing system in which described embodiments can be implemented.

FIG. 9 depicts an example of a suitable computing system 900 in which the described innovations can be implemented. The computing system 900 is not intended to suggest any limitation as to scope of use or functionality of the present disclosure, as the innovations can be implemented in diverse computing systems.

With reference to FIG. 9, the computing system 900 includes one or more processing units 910, 915 and memory 920, 925. In FIG. 9, this basic configuration 930 is included within a dashed line. The processing units 910, 915 can execute computer-executable instructions, such as for implementing the features described in the examples herein (e.g., the methods 300, 400, 500, and 600). A processing unit can be a general-purpose central processing unit (CPU), processor in an application-specific integrated circuit (ASIC), or any other type of processor. In a multi-processing system, multiple processing units can execute computer-executable instructions to increase processing power. For example, FIG. 9 shows a central processing unit 910 as well as a graphics processing unit or co-processing unit 915. The tangible memory 920, 925 can be volatile memory (e.g., registers, cache, RAM), nonvolatile memory (e.g., ROM, EEPROM, flash memory, etc.), or some combination of the two, accessible by the processing unit(s) 910, 915. The memory 920, 925 can store software 980 implementing one or more innovations described herein, in the form of computer-executable instructions suitable for execution by the processing unit(s) 910, 915.

A computing system 900 can have additional features. For example, the computing system 900 can include storage 940, one or more input devices 950, one or more output devices 960, and one or more communication connections 970, including input devices, output devices, and communication connections for interacting with a user. An interconnection mechanism (not shown) such as a bus, controller, or network can interconnect the components of the computing system 900. Typically, operating system software (not shown) can provide an operating environment for other software executing in the computing system 900, and coordinate activities of the components of the computing system 900.

The tangible storage 940 can be removable or non-removable, and includes magnetic disks, magnetic tapes or cassettes, CD-ROMs, DVDs, or any other medium which can be used to store information in a non-transitory way and which can be accessed within the computing system 900. The storage 940 can store instructions for the software implementing one or more innovations described herein.

The input device(s) 950 can be an input device such as a keyboard, mouse, pen, or trackball, a voice input device, a scanning device, touch device (e.g., touchpad, display, or the like) or another device that provides input to the computing system 900. The output device(s) 960 can be a display, printer, speaker, CD-writer, or another device that provides output from the computing system 900.

The communication connection(s) 970 can enable communication over a communication medium to another computing entity. The communication medium can convey information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components can include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example Cloud Computing Environment

Figure 10:
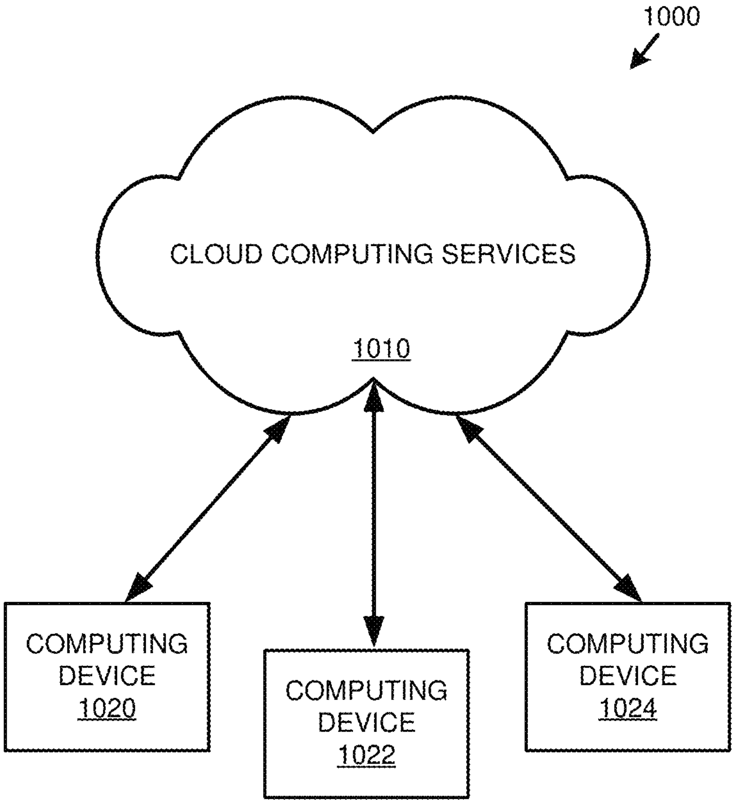
FIG. 10 is a block diagram of an example cloud computing environment that can be used in conjunction with the technologies described herein.

FIG. 10 depicts an example cloud computing environment 1000 in which the described technologies can be implemented, including, e.g., the system 100 and other systems herein. The cloud computing environment 1000 can include cloud computing services 1010. The cloud computing services 1010 can comprise various types of cloud computing resources, such as computer servers, data storage repositories, networking resources, etc. The cloud computing services 1010 can be centrally located (e.g., provided by a data center of a business or organization) or distributed (e.g., provided by various computing resources located at different locations, such as different data centers and/or located in different cities or countries).

The cloud computing services 1010 can be utilized by various types of computing devices (e.g., client computing devices), such as computing devices 1020, 1022, and 1024. For example, the computing devices (e.g., 1020, 1022, and 1024) can be computers (e.g., desktop or laptop computers), mobile devices (e.g., tablet computers or smart phones), or other types of computing devices. For example, the computing devices (e.g., 1020, 1022, and 1024) can utilize the cloud computing services 1010 to perform computing operations (e.g., data processing, data storage, and the like).

In practice, cloud-based, on-premises-based, or hybrid scenarios can be supported.

Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

Example Clauses

Any of the following example clauses can be implemented.

Clause 1. A computer-implemented method, comprising: receiving a query to perform a join operation that joins a first table with a second table based on matching values in a selected column of the first table with values in a selected column of the second table; obtaining a first dictionary for the selected column of the first table and a second dictionary for the selected column of the second table, wherein a dictionary for a given column comprises a plurality of unique values in the given column and corresponding range indices, wherein a count of a given unique value in the given column is mapped to a range associated with a range index corresponding to the given unique value; and determining an output size of the join operation based on the first dictionary and the second dictionary.

Clause 2. The method of clause 1, wherein the range index corresponding to the given unique value is encoded based on a logarithm of the count of the given unique value in the given column to a predefined base.

Clause 3. The method of clause 2, further comprising iteratively determining ranges associated with corresponding range indices, wherein each range index represents a distinct range, and consecutive range indices represent consecutive, non-overlapping ranges, wherein each range is defined by a lower bound and an upper bound, wherein the lower bound of a subsequent range is equal to one more than the upper bound of a preceding range.

Clause 4. The method of one of clauses 1-3, wherein the plurality of unique values in the dictionary for the given column are ordered alphabetically or numerically.

Clause 5. The method of one of clauses 1-4, wherein determining the output size of the join operation comprises: identifying zero or more matching values included in both the first dictionary and the second dictionary; estimating first counts based on range indices corresponding to the matching values in the first dictionary; estimating second counts based on range indices corresponding to the matching values in the second dictionary; calculating products of the first counts and the second counts; and summing the products.

Clause 6. The method of clause 5, wherein estimating a count based on a given range index comprises calculating a geometric mean of a lower bound and an upper bound of the range associated with the given range index.

Clause 7. The method of one of clauses 5-6, further comprising generating a join histogram comprising the matching values and the products.

Clause 8. The method of one of clauses 5-7, wherein changes to the first table since last update of the first dictionary are recorded in a delta table, wherein determining the output size of the join operation further comprises adjusting the first counts based on numbers of records involving the matching values recorded in the delta table.

Clause 9. The method of one of clauses 1-8, further comprising updating the first dictionary after one or more records involving a unique value in the selected column of the first table have been added to or removed from the first table, wherein updating the first dictionary comprises: estimating an initial count based on a range index corresponding to the unique value in the first dictionary; modifying the initial count to an adjusted count based on number of records involving the unique value that have been added to or removed from the first table; and obtaining an updated range index corresponding to the unique value in the first dictionary, wherein the adjusted count is mapped to the range associated with the updated range index.

Clause 10. The method of one of clauses 1-9, further comprising estimating an output size of a filter of the query, wherein the filter specifies a predicate evaluating values in a selected column of a selected table, wherein estimating the output size of the filter comprises: obtaining a dictionary for the selected column; identifying zero or more matching values in the dictionary that satisfy the predicate; estimating counts based on range indices corresponding to the matching values in the dictionary; and summing the counts.

Clause 11. A computing system, comprising: memory; one or more hardware processors coupled to the memory; and one or more non-transitory computer-readable media storing instructions that, when loaded into the memory, cause the one or more hardware processors to perform operations comprising: receiving a query to perform a join operation that joins a first table with a second table based on matching values in a selected column of the first table with values in a selected column of the second table; obtaining a first dictionary for the selected column of the first table and a second dictionary for the selected column of the second table, wherein a dictionary for a given column comprises a plurality of unique values in the given column and corresponding range indices, wherein a count of a given unique value in the given column is mapped to a range associated with a range index corresponding to the given unique value; and determining an output size of the join operation based on the first dictionary and the second dictionary.

Clause 12. The system of clause 11, wherein the range index corresponding to the given unique value is encoded based on a logarithm of the count of the given unique value in the given column to a predefined base.

Clause 13. The system of clause 12, wherein the operations further comprise iteratively determining ranges associated with corresponding range indices, wherein each range index represents a distinct range, and consecutive range indices represent consecutive, non-overlapping ranges, wherein each range is defined by a lower bound and an upper bound, wherein the lower bound of a subsequent range is equal to one more than the upper bound of a preceding range.

Clause 14. The system of one of clauses 11-13, wherein the plurality of unique values in the dictionary for the given column are ordered alphabetically or numerically.

Clause 15. The system of one of clauses 11-14, wherein determining the output size of the join operation comprises: identifying zero or more matching values included in both the first dictionary and the second dictionary; estimating first counts based on range indices corresponding to the matching values in the first dictionary; estimating second counts based on range indices corresponding to the matching values in the second dictionary; calculating products of the first counts and the second counts; and summing the products.

Clause 16. The system of clause 15, wherein estimating a count based on a given range index comprises calculating a geometric mean of a lower bound and an upper bound of the range associated with the given range index.

Clause 17. The system of one of clauses 15-16, wherein changes to the first table since last update of the first dictionary are recorded in a delta table, wherein determining the output size of the join operation further comprises adjusting the first counts based on numbers of records involving the matching values recorded in the delta table.

Clause 18. The system of one of clauses 11-17, wherein the operations further comprise updating the first dictionary after one or more records involving a unique value in the selected column of the first table have been added to or removed from the first table, wherein updating the first dictionary comprises: estimating an initial count based on a range index corresponding to the unique value in the first dictionary; modifying the initial count to an adjusted count based on number of records involving the unique value that have been added to or removed from the first table; and obtaining an updated range index corresponding to the unique value in the first dictionary, wherein the adjusted count is mapped to the range associated with the updated range index.

Clause 19. The system of one of clauses 11-18, wherein the operations further comprise estimating an output size of a filter of the query, wherein the filter specifies a predicate evaluating values in a selected column of a selected table, wherein estimating the output size of the filter comprises: obtaining a dictionary for the selected column; identifying zero or more matching values in the dictionary that satisfy the predicate; estimating counts based on range indices corresponding to the matching values in the dictionary; and summing the counts.

Clause 20. One or more non-transitory computer-readable media having encoded thereon computer-executable instructions causing one or more processors to perform a method comprising: receiving a query to perform a join operation that joins a first table with a second table based on matching values in a selected column of the first table with values in a selected column of the second table; obtaining a first dictionary for the selected column of the first table and a second dictionary for the selected column of the second table, wherein a dictionary for a given column comprises a plurality of unique values in the given column and corresponding range indices, wherein a count of a given unique value in the given column is mapped to a range associated with a range index corresponding to the given unique value; and determining an output size of the join operation based on the first dictionary and the second dictionary.

The technologies from any clause can be combined with the technologies described in any one or more of the other clauses.

EXAMPLE ALTERNATIVES

Although column store database tables are described above as examples, it should be understood that the technologies described herein can also be applied to row store databases, e.g., by transposing a row store table to a column store table.

In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method for improving query optimization in a database management system, comprising:

receiving, by a query processing engine, a query to perform a join operation that joins a first table with a second table based on matching values in a selected column of the first table with values in a selected column of the second table;

obtaining, by a query optimizer of the query processing engine, a first dictionary for the selected column of the first table and a second dictionary for the selected column of the second table, wherein a dictionary for a given column comprises a plurality of entries each associating a unique value occurring in the given column with a corresponding range index, wherein each corresponding range index identifies a respective predefined count range among a plurality of predefined count ranges for occurrence counts in the given column, and wherein an occurrence count of the unique value associated with a respective entry falls within the respective predefined count range identified by the corresponding range index associated with the respective entry;

determining, by the query optimizer, an output size of the join operation, comprising:

identifying one or more matching values included in both the first dictionary and the second dictionary;

for each matching value, estimating a first count for the matching value based on a first predefined count range identified by a first range index associated with the matching value in the first dictionary, wherein the first count is within the first predefined count range;

for each matching value, estimating a second count for the matching value based on a second predefined count range identified by a second range index associated with the matching value in the second dictionary, wherein the second count is within the second predefined count;

for each matching value, calculating a product of the first count and the second count; and calculating a sum of the products over the matching values, wherein the output size is the sum of the products; and determining, by the query optimizer, a query execution plan for the query based on the output size.

2. The method of claim 1, wherein, for each entry of the plurality of entries in a respective dictionary, the range index associated with the unique value is encoded based on a logarithm of the occurrence count of the unique value in the given column to a predefined base.

3. The method of claim 2, further comprising iteratively determining count ranges associated with corresponding ones of the range indices, wherein each range index represents a distinct count range, and consecutive range indices represent consecutive, non-overlapping count ranges, wherein each count range is defined by a lower bound and an upper bound, wherein the lower bound of a subsequent count range is equal to one more than the upper bound of a preceding count range.

4. The method of claim 1, wherein the plurality of entries in the dictionary for the given column are ordered alphabetically or numerically based on the unique values occurring in the given column.

5. The method of claim 1, wherein estimating the first count based on the first range index comprises calculating a geometric mean of a lower bound and an upper bound of the first predefined count range identified by the first range index, and wherein estimating the second count based on the second range index comprises calculating a geometric mean of a lower bound and an upper bound of the second predefined count range identified by the second range index.

6. The method of claim 1, further comprising generating a join histogram comprising the matching values and the products.

7. The method of claim 1, wherein changes to the first table since last update of the first dictionary are recorded in a delta table, wherein determining the output size of the join operation further comprises adjusting the first counts for the matching values based on numbers of records involving the matching values recorded in the delta table.

8. The method of claim 1, further comprising updating the first dictionary after one or more records involving a unique value in the selected column of the first table have been added to or removed from the first table, wherein updating the first dictionary comprises: estimating an initial count based on a range index associated with the unique value in the first dictionary; modifying the initial count to an adjusted count based on a number of records involving the unique value that have been added to or removed from the first table; and obtaining an updated range index associated with the unique value in the first dictionary, wherein the adjusted count is mapped to a predefined count range identified by the updated range index.

9. The method of claim 1, further comprising estimating an output size of a filter of the query, wherein the filter specifies a predicate evaluating values in a selected column of a selected table, wherein estimating the output size of the filter comprises: obtaining a dictionary for the selected column; identifying zero or more predicate-satisfying values in the dictionary that satisfy the predicate; for each predicate-satisfying value, estimating a count for the predicate-satisfying value based on a range index associated with the predicate-satisfying value in the dictionary; and calculating a sum of the counts over the predicate-satisfying values, wherein the output size of the filter is the sum of the counts.

10. A computing system for improving query optimization in a database management system, comprising:

memory;

one or more hardware processors coupled to the memory; and one or more non-transitory computer-readable media storing instructions that, when loaded into the memory, cause the one or more hardware processors to perform operations comprising:

receiving, by a query processing engine, a query to perform a join operation that joins a first table with a second table based on matching values in a selected column of the first table with values in a selected column of the second table;

obtaining, by a query optimizer of the query processing engine, a first dictionary for the selected column of the first table and a second dictionary for the selected column of the second table, wherein a dictionary for a given column comprises a plurality of entries each associating a unique value occurring in the given column with a corresponding range index, each corresponding range index identifies a respective predefined count range among a plurality of predefined count ranges for occurrence counts in the given column, and wherein an occurrence count of the unique value associated with a respective entry falls within the respective predefined count range identified by the corresponding range index associated with the respective entry;

determining, by the query optimizer, an output size of the join operation, comprising:

identifying one or more matching values included in both the first dictionary and the second dictionary;

for each matching value, estimating a first count for the matching value based on a first predefined count range identified by a first range index associated with the matching value in the first dictionary, wherein the first count is within the first predefined count range; for each matching value, estimating a second count for the matching value based on a second predefined count range identified by a second range index associated with the matching value in the second dictionary, wherein the second count is within the second predefined count range;

for each matching value, calculating a product of the first count and the second count; and calculating a sum of the products over the matching values, wherein the output size is the sum of the products; and determining, by the query optimizer, a query execution plan for the query based on the output size.

11. The system of claim 10, wherein, for each entry of the plurality of entries in a respective dictionary, the range index associated with the unique value is encoded based on a logarithm of the occurrence count of the unique value in the given column to a predefined base.

12. The system of claim 11, wherein the operations further comprise iteratively determining count ranges associated with corresponding ones of the range indices, wherein each range index represents a distinct count range, and consecutive range indices represent consecutive, non-overlapping count ranges, wherein each count range is defined by a lower bound and an upper bound, wherein the lower bound of a subsequent count range is equal to one more than the upper bound of a preceding count range.

13. The system of claim 10, wherein the plurality of entries in the dictionary for the given column are ordered alphabetically or numerically based on the unique values occurring in the given column.

14. The system of claim 10, wherein estimating the first count based on the first range index comprises calculating a geometric mean of a lower bound and an upper bound of the first predefined count range identified by the first range index, and wherein estimating the second count based on the second range index comprises calculating a geometric mean of a lower bound and an upper bound of the second predefined count range identified by the second range index.

15. The system of claim 10, wherein changes to the first table since last update of the first dictionary are recorded in a delta table, wherein determining the output size of the join operation further comprises adjusting the first counts for the matching values based on numbers of records involving the matching values recorded in the delta table.

16. The system of claim 10, wherein the operations further comprise updating the first dictionary after one or more records involving a unique value in the selected column of the first table have been added to or removed from the first table, wherein updating the first dictionary comprises: estimating an initial count based on a range index associated with the unique value in the first dictionary; modifying the initial count to an adjusted count based on a number of records involving the unique value that have been added to or removed from the first table; and obtaining an updated range index associated with the unique value in the first dictionary, wherein the adjusted count is mapped to a predefined count range identified by the updated range index.

17. The system of claim 10, wherein the operations further comprise estimating an output size of a filter of the query, wherein the filter specifies a predicate evaluating values in a selected column of a selected table, wherein estimating the output size of the filter comprises: obtaining a dictionary for the selected column; identifying zero or more predicate-satisfying values in the dictionary that satisfy the predicate; for each predicate-satisfying value, estimating a count for the predicate-satisfying value based on a range index associated with the predicate-satisfying value in the dictionary; and calculating a sum of the counts over the predicate-satisfying values, wherein the output size of the filter is the sum of the counts.

18. One or more non-transitory computer-readable media having encoded thereon computer-executable instructions causing one or more processors to perform a method for improving query optimization in a database management system, the method comprising:

receiving, by a query processing engine, a query to perform a join operation that joins a first table with a second table based on matching values in a selected column of the first table with values in a selected column of the second table;

obtaining, by a query optimizer of the query processing engine, a first dictionary for the selected column of the first table and a second dictionary for the selected column of the second table, wherein a dictionary for a given column comprises a plurality of entries each associating a unique value occurring in the given column with a corresponding range index, wherein each corresponding range index identifies a respective predefined count range among a plurality of predefined count ranges for occurrence counts in the given column, and wherein an occurrence count of the unique value associated with a respective entry falls within the respective predefined count range identified by the corresponding range index associated with the respective entry;

determining, by the query optimizer, an output size of the join operation, comprising:

identifying one or more matching values included in both the first dictionary and the second dictionary;

for each matching value, estimating a first count for the matching value based on a first predefined count range identified by a first range index associated with the matching value in the first dictionary, wherein the first count is within the first predefined count range;

for each matching value, estimating a second count for the matching value based on a second predefined count range identified by a second range index associated with the matching value in the second dictionary, wherein the second count is within the second predefined count range; for each matching value, calculating a product of the first count and the second count; and calculating a sum of the products over the matching values, wherein the output size is the sum of the products; and determining, by the query optimizer, a query execution plan for the query based on the output size.

19. The method of claim 1, wherein obtaining the first dictionary and the second dictionary comprises generating, on-demand during query processing for the query, at least one of the first dictionary or the second dictionary.

20. The method of claim 7, wherein adjusting the first counts for the matching values comprises: for each matching value having at least one record recorded in the delta table, randomly selecting an initial count for the matching value from the first predefined count range identified by the first range index associated with the matching value in the first dictionary, and adjusting the initial count based on the number of records involving the matching value recorded in the delta table.

* * * * *